US012485066B2

(12) United States Patent
Park

(10) Patent No.: US 12,485,066 B2
(45) Date of Patent: Dec. 2, 2025

(54) INDIVIDUALLY CONTROLLABLE VULVAR FUMIGATOR FOR WOMEN

(71) Applicant: Sung Hoon Park, Seoul (KR)

(72) Inventor: Sung Hoon Park, Seoul (KR)

( * ) Notice: Subject to any disclaimer, the term of this patent is extended or adjusted under 35 U.S.C. 154(b) by 88 days.

(21) Appl. No.: 18/698,352

(22) PCT Filed: Jul. 19, 2022

(86) PCT No.: PCT/KR2022/010501
§ 371 (c)(1),
(2) Date: Apr. 3, 2024

(87) PCT Pub. No.: WO2023/058856
PCT Pub. Date: Apr. 13, 2023

(65) Prior Publication Data

US 2024/0398662 A1 Dec. 5, 2024

(30) Foreign Application Priority Data

Oct. 7, 2021 (KR) ........................ 10-2021-0133277

(51) Int. Cl.
*A61H 33/06* (2006.01)
*A61H 33/00* (2006.01)

(52) U.S. Cl.
CPC ........... *A61H 33/005* (2013.01); *A61H 33/06* (2013.01); *A61H 2033/0079* (2013.01); *A61H 2033/0083* (2013.01); *A61H 2201/0157* (2013.01); *A61H 2201/0207* (2013.01); *A61H 2201/025* (2013.01); *A61H 2201/165* (2013.01); *A61H 2201/5097* (2013.01); *A61H 2205/087* (2013.01)

(58) Field of Classification Search
CPC .................. A61H 33/005; A61H 33/06; A61H 2033/0079; A61H 2033/0083; A61H 2201/0157; A61H 2201/025; A61H 2201/165; A61H 2205/087
USPC .............................................................. 4/535
See application file for complete search history.

(56) References Cited

U.S. PATENT DOCUMENTS 3,626,941 A * 12/1971 Webb ........................ A47K 7/08
604/347
2022/0047840 A1 * 2/2022 Lee ......................... C04B 33/32

FOREIGN PATENT DOCUMENTS

| | | | |
|---|---|---|---|
| KR | 20-0333369 | Y1 | 11/2003 |
| KR | 10-2012-0009754 | A | 2/2012 |
| KR | 10-2076466 | B1 | 3/2020 |
| KR | 10-2021-0091894 | A | 7/2021 |

* cited by examiner

*Primary Examiner* — Huyen D Le

(74) *Attorney, Agent, or Firm* — NKL Law; Jae Youn Kim

(57) ABSTRACT

The present invention relates to an individually controllable vulvar fumigator for women, the fumigator being implemented to enable individually controlled spraying of fume at the genital side and hot air at the anal side, while emitting, at the genital and anal areas of women, LED light sources, which helps to treat inflammation and has a sterilization function.

6 Claims, 7 Drawing Sheets

INDIVIDUALLY CONTROLLABLE VULVAR FUMIGATOR FOR WOMEN

TECHNICAL FIELD

The present invention relates to an individually controllable vulvar fumigator for women, more specifically to an individually controllable vulvar fumigator for women that is capable of being mountable on the vulva to enable individually controlled spraying of fume into the genital area and hot air at the anal area, while emitting, onto the genital and anal areas of women, LED light sources, which helps to treat inflammation and has a sterilization function, thereby preventing heat efficiency from being deteriorated and satisfying a user's desire in use through the individual control of the fume and hot air sprayed into the genital area and the anal area.

BACKGROUND ART

Generally, heat therapy in a sitting position, which is based on a meridian system of traditional Oriental medicine, is one of representative Oriental medicines and folk remedies that applies hot heat to the reproductive organs, perineum, anus, and coccyx of men and women to achieve the activation of the organs related to them and accelerate blood circulation and metabolism, so that the functions of internal organs are activated.

In specific, hot heat is applied from the perineal blood as a representative essential point of surgery of the heat therapy in a sitting position to the reproductive organs, anus, and coccyx of men and women, simultaneously, so that heat stimulation is applied to the muscles, subcutaneous cells, micro nerves, blood vessels, spinal nerves, etc., which are related to the perineal blood, the reproductive organs, anus, and coccyx, to produce active bio-reactions of metabolism from the organs such as the heart, liver, stomach, lungs, intestines, and the like, thereby treating adult diseases such as hypertension, diabetes, cancers, heart diseases, womb diseases, coldness, gastrointestinal diseases, and the like and preventing incurable diseases from occurring.

Further, hot heat serves to dissolve some of fat accumulated in the abdomen area, saturated fat built up in blood vessels, thrombus (extravasated blood), and uric acid of fatigue factors, so that micro nerves and body fluids are activated and blood circulation and metabolism are accelerated to boost immunity, thereby optimizing the efficacy of the heat therapy in a sitting position.

Conventional heat therapy in a sitting position is classified into electric type heat therapy using electricity as a heat source and a toilet or jar type steam seat using steam generated from dried mugwort burnt.

In the case of the electric type heat therapy, metal or ceramic powder is heated with a power source to allow medicinal herbs to be burnt thereby, so that the heat or steam generated therefrom is applied to a user's body, and in the case of the toilet or jar type steam seat, mugwort or medicinal herb is burnt in the interior thereof, so that the heat generated therefrom is irradiated onto the reproductive organs, perineum, and anus. Recently, a product having a heating function, which is configured to mount a hot pad onto a woman's underwear, has been proposed to remove the coldness of the reproductive organ.

According to an electric local steamer as issued conventionally, coupling processes among electric parts and accessories such as a hot coil, a seat, a disc, and a latent heat material and the use of the latent heat material as a chemical product are needed in a process of generating hot heat, thereby causing many inconveniences in making and using the electric local steamer, and according to ajar type seat steamer attached to the underside of a seat, as issued conventionally, a burner is inserted into ajar to apply heat generated therefrom to the local area and the genital area. In this case, since the jar fixed to the underside of the seat is bulky, many inconveniences may occur in keeping and using the jar type seat steamer, thereby having limitations in popularly purchasing and using the jar type seat steamer.

In the case of the product having the steaming function that is configured to mount a hot pad onto a woman's underwear to remove the coldness of the reproductive organ, a bag (pocket) for accommodating the hot pad and a thermally conductive film connected to the bag apply stimulations onto the sensitive reproductive organ or anus of the woman, the hips are uncomfortably pressurized against the hot pad mounted onto the underwear, and thermally conductive heat is low at temperature, so that moxibustion, which causes the activation of the internal organs related to the reproductive organs, perineum, anus, and coccyx and the acceleration of the blood circulation, has no efficiency.

To solve such problems, a vulva fumigator for women (as disclosed in Korean Patent Application No. 10-2020-0005147) has been filed and issued to the same applicant as the present invention.

The conventional vulva fumigator for women includes a housing open on one surface thereof to form a space portion therein and having a supply hole formed on top thereof to supply water, the housing being curved to cover the genital area and the anus when worn, a water storage part located on one side of the interior of the housing and having an inlet and an outlet adapted to store and supply the water through the supply hole, a controller fixed to the interior of the housing on one side of the water storage part under the water storage part and having a power supply part adapted to control the operations thereof according to the control of a smartphone having a Bluetooth function or the control of a remote controller, a fume supply part located on the other side of the water storage part under the water storage part in such a way as to operate according to the control of the controller to receive and vaporize the water stored in the water storage part, pass the vaporized water through a functional filter, and supply the water as fume, a spray member connected to the fume supply part by means of a supply pipe on which a check valve is mounted and having a plurality of spray nozzles for spraying the fume generated from the fume supply part into a user's genital area and anus, an irradiation part fixedly located on the front surface of the spray member in such a way as to expose the ends of the injection nozzles of the spray member to allow the fume to be sprayed and having LEDs mounted on the front surface thereof in such a way as to irradiate light emitted therefrom onto the genital area and the anus, the irradiation part being controllable in wavelength under the control of the controller, and a protection film having one end fixed to the edge of the housing and the other end protruding in one direction in such a way as to allow the housing to be brought into close contact with the user's skin when worn.

According to the conventional vulva fumigator for women, however, the fume is sprayed into the genital area and the anus through a single heating pipe for hot air supply of the fume supply part, thereby disadvantageously lowering heat efficiency.

According to the conventional vulva fumigator for women, besides, the single heating pipe for hot air supply of the fume supply part is controlled to allow the fume to be sprayed into the genital area and the anus, so that the temperature of the fume sprayed into the genital area is the same as sprayed into the anus, thereby disadvantageously failing to satisfy a user's desire to allow hotter fume to be sprayed into the anus.

DISCLOSURE OF THE INVENTION

Technical Problems

Accordingly, the present invention has been made in view of the above-mentioned problems occurring in the related art, and it is an object of the present invention to provide an individually controllable vulvar fumigator for women that is capable of being mountable on the vulva to enable individually controlled spraying of fume into the genital area and hot air at the anal area, while emitting, onto the genital and anal areas of women, LED light sources, which helps to treat inflammation and has a sterilization function, thereby preventing heat efficiency from being deteriorated and satisfying a user's desire in use through the individual control of the fume and hot air sprayed into the genital area and the anal area.

Other objects of the present invention will be obvious through the following description.

Technical Solutions

To accomplish the above-mentioned objects, according to the present invention, there is provided an individually controllable vulvar fumigator for women, including: a curved plate-like base member 110 adapted to cover a user's genital area and anus and having a genital area spray hole 110*a* and an anus spray hole 110*b* formed on one side and the other side thereof, a controller 120 disposed on one side of one surface of the base member 110 and having an operating button 121, a power supply part 122, and a PCB 123 adapted to control operations thereof according to the control of a smartphone having a Bluetooth function or the control of a remote controller; a hot air and fume spray part 130 disposed close to the controller 120 on one surface of the base member 110 in such a way as to spray hot air into the genital area or spray fume into the anus under the control of the controller 120 according to the user's selection; an anus hot air spray part 140 disposed close to the hot air and fume spray part 130 on one surface of the base member 110 in such a way as to operate under the control of the controller 120 to allow the hot air to be sprayed into the anus through the anus spray hole 110*b*; an irradiation part 150 fixedly disposed on the other surface of the base member 110 in such a way as to be controllable in wavelength under the control of the controller 120 to allow light emitted from LEDs to be irradiated onto the genital area and the anus; and a covering member 160 configured to allow one end thereof to be detachably coupled to one surface of the base member 110 in such a way as to coveringly protect the controller 120, the hot air and fume spray part 130, and the anus hot air spray part 140 from the outside.

Further, the hot air and fume spray part 130 may include an installation plate 131 spaced apart from one side of the controller 120 in such a way as to be fixed to one surface of the base member 110 and having an installation hole formed thereon, a vaporizer 132 mounted on the installation hole of the installation plate 131 in such a way as to operate under the control of the controller 120, a water container 133 detachably mounted on the vaporizer 132 in such a way as to be located at one side surface of the installation plate 131 to store and supply water, a fume spray housing 134 spaced apart from the other side of the installation plate 131 in such a way as to be fixed to the base member 110, a fume heater 135 located at one side of the interior of the fume spray housing 134 in such a way as to emit heat under the control of the controller 120, a fume blower 136 disposed close to the fume heater 135 at the inside of the fume spray housing 134 in such a way as to blow air toward the fume heater 135 under the control of the controller 120, and a fume supply pipe 137 having one end connected to the vaporizer 132 and the other end divided into two ends in such a way as to allow one of the two ends to communicate with the interior of the fume spray housing 134 and allow the other to be connected to the genital area spray hole 110*a*, so that the fume is supplied to the genital area spray hole 110*a*.

Furthermore, the anus hot air spray part 140 may include an anus spray housing 141 disposed close to the hot air and fume spray part 130 in such a way as to be fixed to one surface of the base member 110, an anus heater 142 located at one side of the interior of the anus spray housing 141 in such a way as to emit heat under the control of the controller 120, an anus blower 143 disposed close to the anus heater 142 at the inside of the anus spray housing 141 in such a way as to blow air toward the anus heater 142 under the control of the controller 120, and an anus supply pipe 144 having one end connected to the anus spray housing 141 and the other end connected to the anus spray hole 110*b* in such a way as to allow the hot air to be supplied to the anus spray hole 110*b*.

Further, the covering member 160 may include first, second, and third covering members 161, 162, and 163 adapted to coveringly protect the controller 120, the hot air and fume spray part 130, and the anus hot air spray part 140 from the outside if one end of the covering member 160 is detachably coupled to one surface of the base member 110, the first covering member 161 having a button exposing hole and lamp exposure holes formed thereon in such a way as to expose the operating button 121 and notifying lamps 124 of the controller 120 to the outside, and the third covering member 163 having introduction holes 163*a* formed thereon in such a way as to introduce outside air.

Advantageous Effects of the Invention

According to the present invention, the individually controllable vulvar fumigator for women is mountable on the vulva to enable individually controlled spraying of fume into the genital area and hot air at the anal area, while emitting, onto the genital and anal areas of women, LED light sources, which helps to treat inflammation and has a sterilization function, thereby preventing heat efficiency from being deteriorated and satisfying a user's desire in use through the individual control of the fume and hot air sprayed into the genital area and the anal area.

BEST MODE FOR INVENTION

Figure 1:
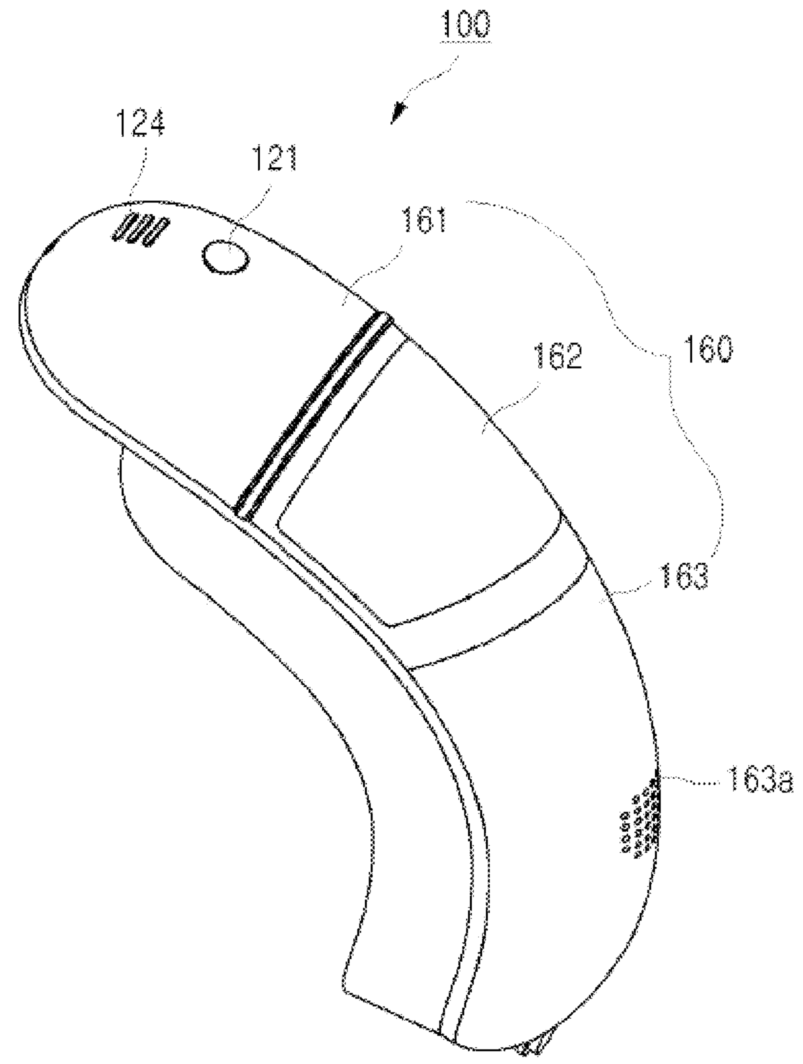
FIG. 1 is a perspective view showing top of an individually controllable vulvar fumigator for women according to the present invention.
Figure 2:
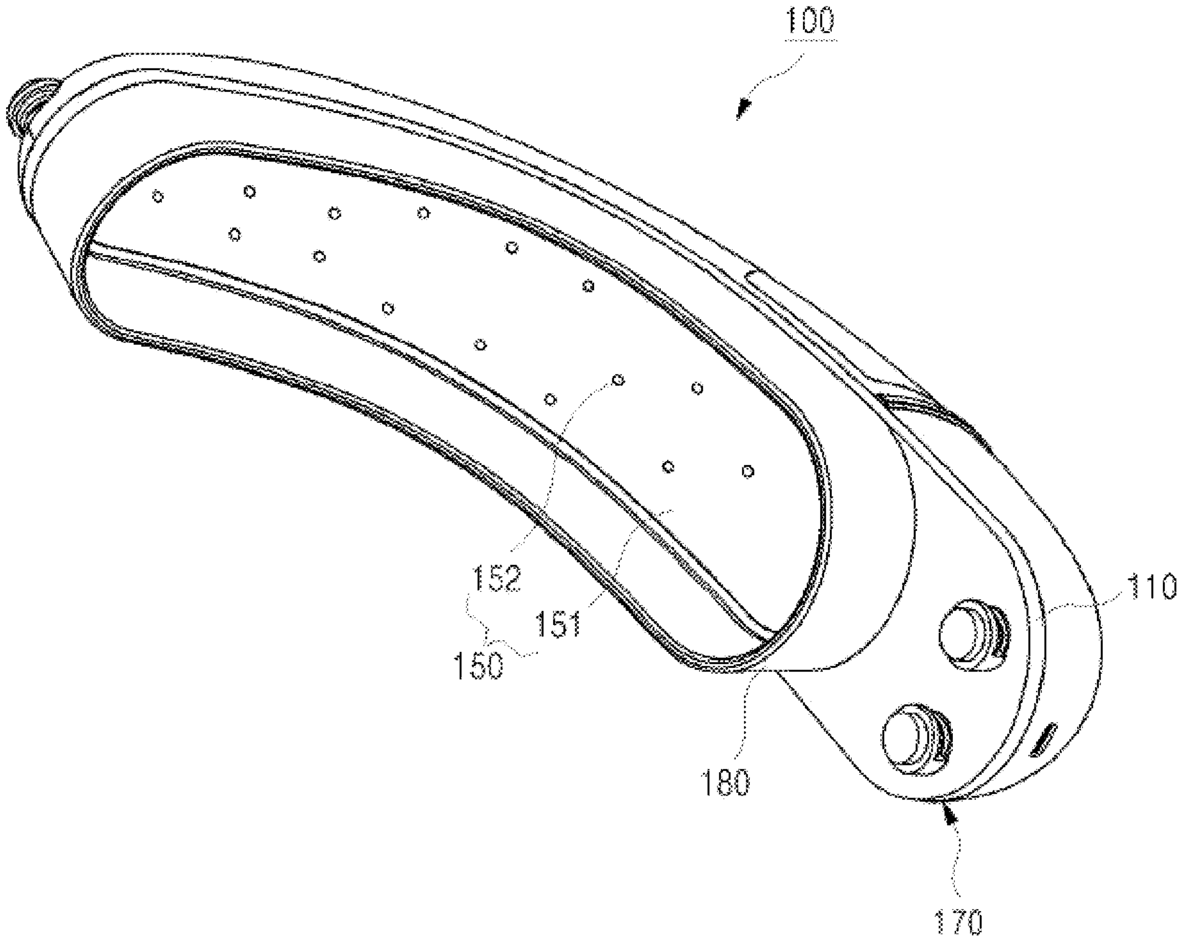
FIG. 2 is a perspective view showing the underside of the individually controllable vulvar fumigator for women according to the present invention.
Figure 3:
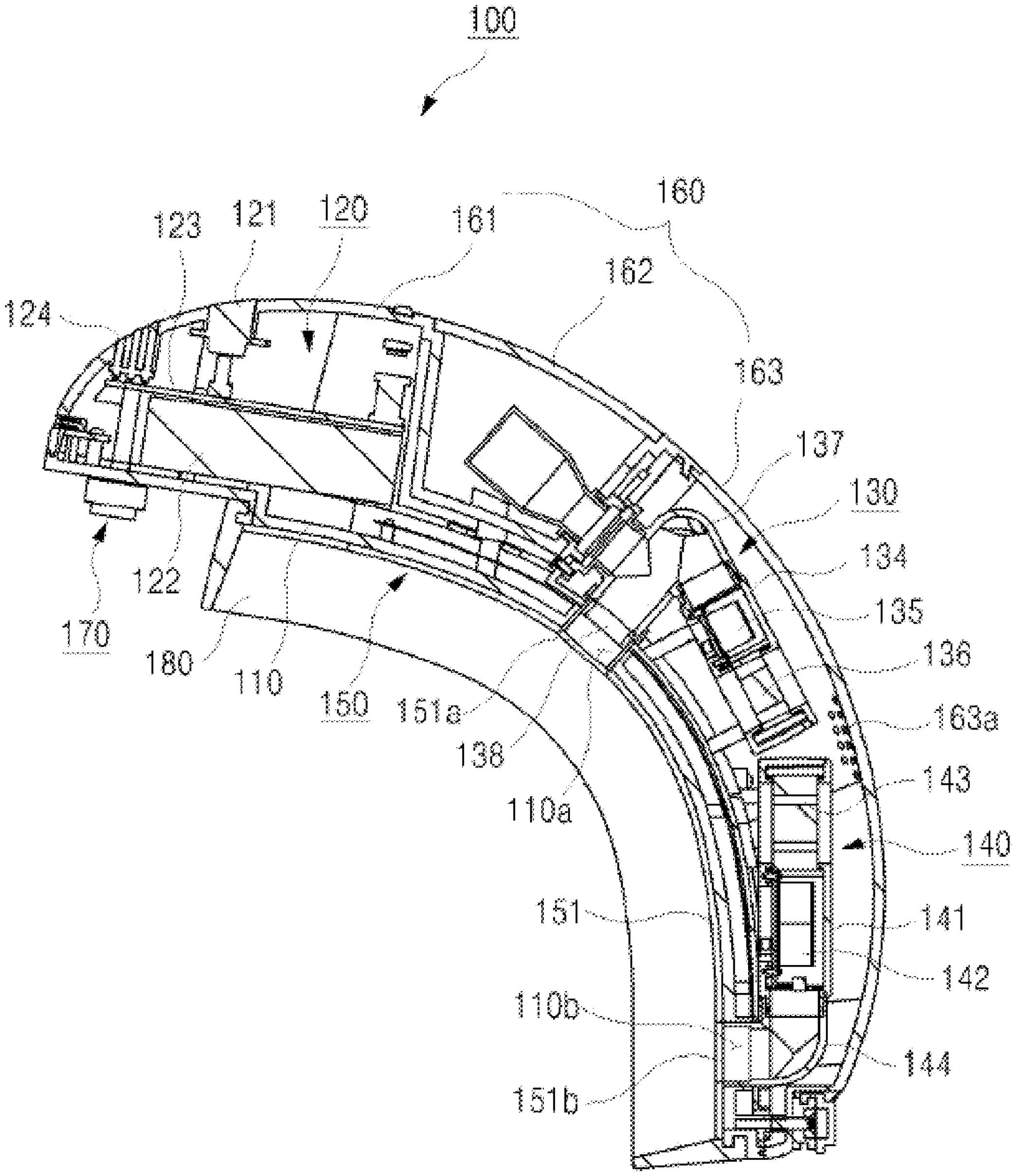
FIG. 3 is a sectional view showing the individually controllable vulvar fumigator for women according to the present invention.
Figure 4:
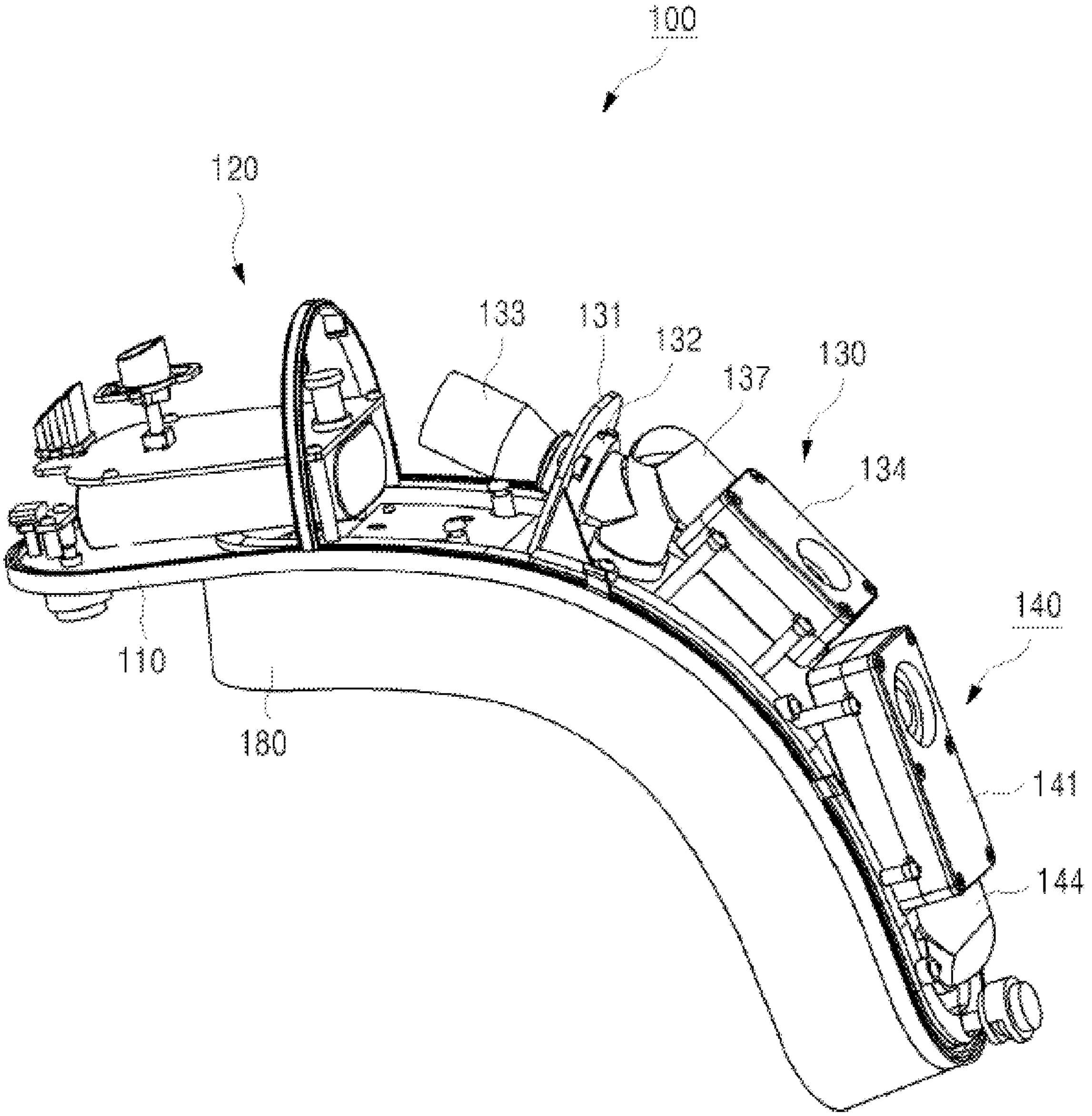
FIG. 4 is a perspective view showing the interior of the individually controllable vulvar fumigator for women according to the present invention, from which a covering member is removed.

The present invention relates to an individually controllable vulvar fumigator 100 for women including: a curved plate-like base member 110 adapted to cover a user's genital area and anus and having a genital area spray hole 110*a* and an anus spray hole 110*b* formed on one side and the other side thereof, a controller 120 disposed on one side of one surface of the base member 110 and having an operating button 121, a power supply part 122, and a PCB 123 adapted to control operations thereof according to the control of a smartphone having a Bluetooth function or the control of a remote controller; a hot air and fume spray part 130 disposed close to the controller 120 on one surface of the base member 110 in such a way as to spray hot air into the genital area or spray fume into the anus under the control of the controller 120 according to the user's selection; an anus hot air spray part 140 disposed close to the hot air and fume spray part 130 on one surface of the base member 110 in such a way as to operate under the control of the controller 120 to allow the hot air to be sprayed into the anus through the anus spray hole 110*b*; an irradiation part 150 fixedly disposed on the other surface of the base member 110 in such a way as to be controllable in wavelength under the control of the controller 120 to allow light emitted from LEDs to be irradiated onto the genital area and the anus; and a covering member 160 configured to allow one end thereof to be detachably coupled to one surface of the base member 110 in such a way as to coveringly protect the controller 120, the hot air and fume spray part 130, and the anus hot air spray part 140 from the outside.

MODE FOR INVENTION

Hereinafter, an explanation of an individually controllable vulvar fumigator for women according to an embodiment of the present invention will be given in detail.

However, for reference numerals, with respect to the same elements, even though they may be displayed in different drawings, such elements use same reference numerals as much as possible. Also, in explaining the example embodiments, detailed description on known elements or functions will be omitted if it is determined that such description will interfere with understanding of the embodiments.

As shown, an individually controllable vulvar fumigator for women according to the present invention is configured to allow fume supplied to the genital area and hot air supplied to the anal area to be individually controllable.

In specific, an individually controllable vulvar fumigator 100 for women according to the present invention is provided with a curved plate-like base member 110 adapted to cover a user's genital area and anus and having a genital area spray hole 110*a* and an anus spray hole 110*b* formed on one side and the other side thereof and a controller 120 disposed on one side of one surface of the base member 110 and having an operating button 121, a power supply part 122, and a PCB 123 adapted to control operations thereof according to the control of a smartphone having a Bluetooth function or the control of a remote controller.

Further, the individually controllable vulvar fumigator 100 is provided with a hot air and fume spray part 130 that is disposed close to the controller 120 on one surface of the base member 110 in such a way as to spray hot air into the genital area or spray fume into the genital area under the control of the controller 120 according to the user's selection.

Furthermore, the individually controllable vulvar fumigator 100 is provided with a hot air spray part 140 for the anus that is disposed close to the hot air and fume spray part 130 on one surface of the base member 110 in such a way as to operate under the control of the controller 120 to allow the hot air to be sprayed only into the anus through the anus spray hole 110*b*, an irradiation part 150 that is fixedly disposed on the other surface of the base member 110 in such a way as to be controllable in wavelength under the control of the controller 120 to allow LEDs as light sources to emit light toward the genital area and the anus, and a covering member 160 that is configured to allow one end thereof to be detachably coupled to one surface of the base member 110 to coveringly protect the controller 120, the hot air and fume spray part 130, and the hot air spray part 140 for the anus from the outside.

Further, the individually controllable vulvar fumigator 100 includes wearing parts 170 located on one surface and the other surface of the base member 110, respectively, to allow the individually controllable vulvar fumigator 100 to be worn on the user's body.

Besides, the individually controllable vulvar fumigator 100 includes a cover pad 180 made of silicone and configured to allow one end thereof to be detachably attached to the other surface edge of the base member 110, while the other end thereof is protruding toward one direction, and the cover pad 180 serves to cover the user's skin when the individually controllable vulvar fumigator 100 is worn on the user's body.

Hereinafter, the individually controllable vulvar fumigator 100 for women according to the present invention will be explained in detail with reference to FIGS. 1 to 4.

First, the individually controllable vulvar fumigator 100 according to the present invention is provided with the base member 110 that has the shape of an oval-shaped curved plate for covering the user's genital area and anus.

Further, the base member 110 has a covering member accommodation groove (having no reference numeral) and a cover pad accommodation groove (having no reference numeral) formed on the edges of one surface and the other surface thereof to insert one end of the covering member 160 and one end of the cover pad 180, respectively, so that the covering member 160 and the cover pad 180 are detachably mounted thereon.

Furthermore, the base member 110 is provided with the genital area spray hole 110*a* and the anus spray hole 110*b* formed thereon to spray the fume sprayed from the hot air and fume spray part 130 and the hot air sprayed from the hot air spray part 140 for the anus into the genital area and the anus, respectively.

The controller 120 is disposed on one side of one surface of the base member 110 and has the operating button 121, the power supply part 122, and the PCB 123 in such a way as to control the operations of the individually controllable vulvar fumigator 100 according to the control of the smartphone having a Bluetooth function or the control of the remote controller, that is, to individually control the hot air and fume spray part 130 and the hot air spray part 140 for the anus.

Further, the controller 120 includes notifying lamps 124 for emitting different light in such a way as to notify the user of charged amounts of the power supply part 122.

The hot air and fume spray part 130 is disposed close to the controller 120 on one surface of the base member 110 in such a way as to control a vaporizer 132 as will be discussed later under the control of the controller 120 according to the user's selection to allow hot air to be sprayed into the genital area or allow the fume to be sprayed into the anus.

That is, the hot air and fume spray part 130 includes an installation plate 131 spaced apart from one side of the controller 120 in such a way as to be fixed to one surface of the base member 110 and having an installation hole (having no reference numeral) formed thereon, the vaporizer 132 mounted on the installation hole of the installation plate 131 in such a way as to operate under the control of the controller 120, a water container 133 detachably mounted on the vaporizer 132 in such a way as to be located at one side surface of the installation plate 131 to store and supply water, a fume spray housing 134 spaced apart from the other side of the installation plate 131 in such a way as to be fixed to the base member 110, a fume heater 135 located at one side of the interior of the fume spray housing 134 in such a way as to emit heat under the control of the controller 120, a fume blower 136 disposed close to the fume heater 135 at the inside of the fume spray housing 134 in such a way as to blow air toward the fume heater 135 under the control of the controller 120, and a fume supply pipe 137 having one end connected to the vaporizer 132 and the other end divided into two ends in such a way as to allow one of the two ends to communicate with the interior of the fume spray housing 134 and allow the other to be connected to the genital area spray hole 110*a*, so that the fume is supplied to the genital area spray hole 110*a*.

The vaporizer 132 is controlled by the controller 120 according to the user's selection so that the hot air is sprayed into the genital area or the fume is sprayed into the genital area.

In this case, the water stored in the water container 133 is functional cosmetic water that is made by mixing water with an aroma extract or mugwort extract.

Further, the fume spray housing 134 has a fume introduction hole (having no reference numeral) formed on top thereof in such a way as to introduce outside air thereinto.

Further, the water stored in the water container 133 is functional cosmetic water, but according to the present invention, the water may not be limited to the functional cosmetic water. For example, the water stored in the water container 133 is cleaning water, and the genital area spray hole 110*a* has a functional filter 138 detachably mounted thereonto, the functional filter 138 having aroma or mugwort stored therein.

The hot air spray part 140 for the anus is disposed close to the hot air and fume spray part 130 in such a way as to be fixed to one surface of the base member 110, and the anus hot air spray part 140 operates under the control of the controller 120 to allow the hot air to be sprayed into the anus through the anus spray hole 110*b*.

That is, the anus hot air spray part 140 includes an anus spray housing 141 disposed close to the hot air and fume spray part 130 in such a way as to be fixed to one surface of the base member 110, an anus heater 142 located at one side of the interior of the anus spray housing 141 in such a way as to emit heat under the control of the controller 120, an anus blower 143 disposed close to the anus heater 142 at the inside of the anus spray housing 141 in such a way as to blow air toward the anus heater 142 under the control of the controller 120, and an anus supply pipe 144 having one end connected to the anus spray housing 141 and the other end connected to the anus spray hole 110*b* to allow the hot air to be supplied to the anus spray hole 110*b*.

Further, the anus spray housing 141 has an introduction hole (having no reference numeral) formed on top thereof in such a way as to introduce outside air thereinto.

The irradiation part 150 is fixedly disposed on the other surface of the base member 110 in such a way as to be controllable in wavelength under the control of the controller 120 to allow light emitted from LEDs to be irradiated onto the genital area and the anus.

That is, the irradiation part 150 includes a curved plate-shaped substrate 151 having a genital area communication hole 151*a* and an anus communication hole 151*b* formed thereon in such a way as to communicate with the genital area spray hole 110*a* and the anus spray hole 110*b* when fixed to the other surface of the base member 110 and a plurality of LEDs 152 located on the front surface of the substrate 151 in such a way as to be controllable in wavelength under the control of the controller 120 to emit light helping inflammation treated and having a sterilization function toward the genital area and the anus.

The covering member 160 is configured to allow one end thereof to be detachably coupled to one surface of the base member 110 to coveringly protect the controller 120, the hot air and fume spray part 130, and the anus hot air spray part 140 from the outside, and to do this, the covering member 160 consists of first, second, and third covering members 161, 162, and 163.

In this case, the first covering member 161 of the covering member 160 has a button exposing hole (having no reference numeral) and lamp exposure holes (having no reference numerals) formed thereon in such a way as to expose the operating button 121 and the notifying lamps 124 to the outside, and the third covering member 163 has introduction holes 163*a* formed thereon in such a way as to introduce outside air.

The wearing parts 170 are fixedly located on one surface and the other surface of the base member 110, respectively, to allow the individually controllable vulvar fumigator 100 to be worn on the user's body.

That is, the wearing parts 170 consist of a belt (not shown) having magnets spaced apart from each other and fixed magnets (having no reference numerals) fixed to the rear end of one surface of the base member 110 and to the front side of the other surface of the base member 110 and having different poles from the magnets fixed to the belt so that the fixed magnets are attached to the magnets of the belt.

The wearing parts 170 consist of the belt having the magnets and the fixed magnets fixed to the rear end of one surface and the front side of the other surface of the base member 110, but the present invention may not be limited thereto. For example, snap buttons may replace the magnets and the fixed magnets.

If it is desired to wear and use the individually controllable vulvar fumigator 100 onto the user's body, as shown in FIGS. 1 to 7, the belt of the wearing parts 170 is first worn onto the user's waist, and next, the irradiation part 150 is located to cover the user's genital area and anus. After that, the fixed magnets fixed to the rear end of one surface and the front side of the other surface of the base member 110 are attached to the magnets fixed to the belt.

As a result, the individually controllable vulvar fumigator 100 is fixedly worn onto the user's body.

As the individually controllable vulvar fumigator 100 is worn onto the user's body by means of the wearing parts 170, the cover pad 180 made of silicone is brought into close contact with the user's skin.

In the state where such wearing is completed, an on button of the remote controller is pressed to operate the hot air and fume spray part 130, the anus hot air spray part 140, and the irradiation part 150, so that the light of the LEDs 152 of the irradiation part 150 is irradiated onto the genital area and the anus, and the functional cosmetic water made by mixing water with the aroma extract and thus stored in the water container 133 is vaporized and sprayed into the genital area, while the hot air is being sprayed into the anus.

That is, if the individually controllable vulvar fumigator 100 is turned on, the functional cosmetic water stored in the water container 133 of the hot air and fume spray part 130 is supplied to the vaporizer 132, and next, the functional cosmetic water supplied to the vaporizer 132 is supplied to the fume supply pipe 137, while being vaporized.

The vaporized water supplied to the fume supply pipe 137 is converted into the fume by means of the heat generated from the fume heater 135 located inside the fume spray housing 134 and the hot air supplied from the fume blower 136 located inside the fume spray housing 134, and next, the fume is sprayed into the genital area through the genital area spray hole 110*a* and the genital area communication hole 151*a* of the irradiation part 150.

At the same time when the fume is sprayed into the genital area, the hot air is supplied to the anus supply pipe 144 by means of the operations of the anus heater 142 and the anus blower 143 located inside the anus spray housing 141 of the anus hot air spray part 140, and next, the hot air supplied to the anus supply pipe 144 is sprayed into the anus through the anus spray hole 110*b* and the anus communication hole 151*b*.

Figure 5:
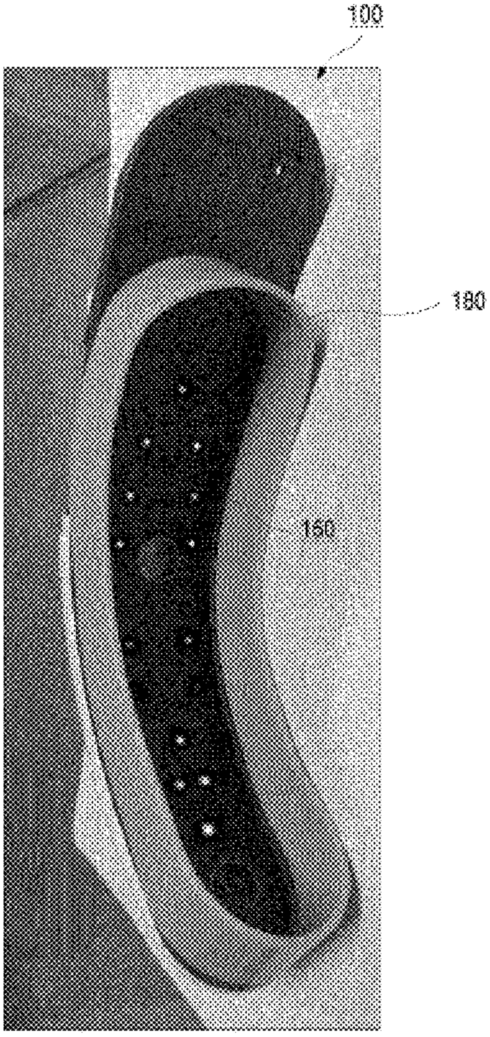
FIGS. 5 to 7 are photographs showing states wherein LEDs of an irradiation part of the individually controllable vulvar fumigator for women according to the present invention operate with different wavelengths.
Figure 6:
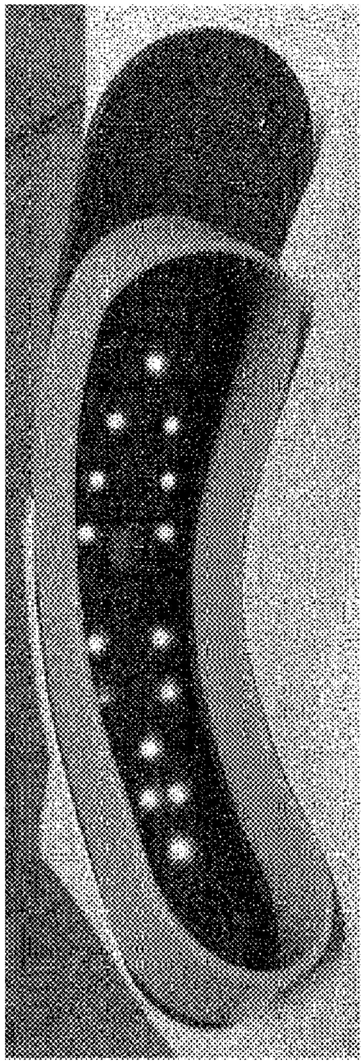
Figure 7:
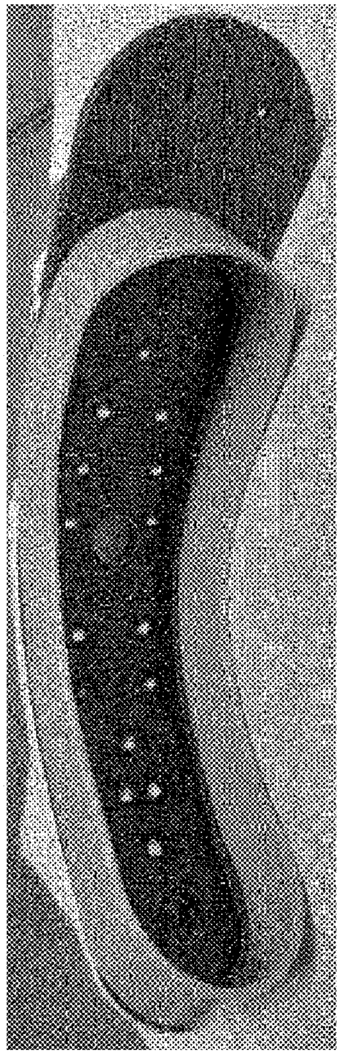

In this case, as shown in FIGS. 5 to 7, the LEDs of the irradiation part 150 have different wavelengths under the control of the remote controller.

Moreover, the hot air and fume spray part 130 and the anus hot air spray part 140 are controllable individually, and if it is desired to spray air hotter than the fume into the anus, a hot air temperature is controlled by the control of the remote controller. As a result, the hotter air than the fume can be sprayed into the anus.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. The present invention may be modified in various ways and may have several exemplary embodiments. It is therefore intended that the scope of the invention be limited not by this detailed description, but rather by the claims appended hereto.

INDUSTRIAL APPLICABILITY OF THE INVENTION

According to the present invention, the individually controllable vulvar fumigator for women is mountable on the vulva to enable individually controlled spraying of fume into the genital area and hot air at the anal area, while emitting, onto the genital and anal areas of women, LED light sources, which helps to treat inflammation and has a sterilization function, thereby preventing heat efficiency from being deteriorated and satisfying a user's desire in use through the individual control of the fume and hot air sprayed into the genital area and the anal area.

The invention claimed is:

1. An individually controllable vulvar fumigator for women, comprising:

a curved plate base member (110) adapted to cover a user's genital area and anus and having a genital area spray hole (110*a*) and an anus spray hole (110*b*) formed on one side and the other side thereof, a controller (120) disposed on one side of one surface of the base member (110) and having an operating button (121), a power supply part (122), and a PCB (123) adapted to control operations thereof according to the control of a smartphone having a Bluetooth function or the control of a remote controller;

a hot air and fume spray part (130) disposed close to the controller (120) on one surface of the base member (110) in such a way as to spray hot air into the genital area or spray fume into the anus under the control of the controller (120) according to the user's selection;

an anus hot air spray part (140) disposed close to the hot air and fume spray part (130) on one surface of the base member (110) in such a way as to operate under the control of the controller (120) to allow the hot air to be sprayed into the anus through the anus spray hole (110*b*);

an irradiation part (150) fixedly disposed on the other surface of the base member (110) in such a way as to be controllable in wavelength under the control of the controller (120) to allow light emitted from LEDs to be irradiated onto the genital area and the anus; and a covering member (160) configured to allow one end thereof to be detachably coupled to one surface of the base member (110) in such a way as to coveringly protect the controller (120), the hot air and fume spray part (130), and the anus hot air spray part (140) from the outside.

2. The individually controllable vulvar fumigator according to claim 1, wherein the hot air and fume spray part (130) comprises an installation plate (131) spaced apart from one side of the controller (120) in such a way as to be fixed to one surface of the base member (110) and having an installation hole formed thereon, a vaporizer (132) mounted on the installation hole of the installation plate (131) in such a way as to operate under the control of the controller (120), a water container (133) detachably mounted on the vaporizer (132) in such a way as to be located at one side surface of the installation plate (131) to store and supply water, a fume spray housing (134) spaced apart from the other side of the installation plate (131) in such a way as to be fixed to the base member (110), a fume heater (135) located at one side of the interior of the fume spray housing (134) in such a way as to emit heat under the control of the controller (120), a fume blower (136) disposed close to the fume heater (135) at the inside of the fume spray housing (134) in such a way as to blow air toward the fume heater (135) under the control of the controller (120), and a fume supply pipe (137) having one end connected to the vaporizer (132) and the other end divided into two ends in such a way as to allow one of the two ends to communicate with the interior of the fume spray housing (134) and allow the other to be connected to the genital area spray hole (110*a*), so that the fume is supplied to the genital area spray hole (110*a*).

3. The individually controllable vulvar fumigator according to claim 2, wherein the water stored in the water container (133) is functional cosmetic water that is made by mixing water with an aroma extract or mugwort extract.

4. The individually controllable vulvar fumigator according to claim 2, wherein the water stored in the water container (133) is cleaning water, and the genital area spray hole (110*a*) has a functional filter (138) detachably mounted thereonto, the functional filter (138) having aroma or mugwort stored therein.

5. The individually controllable vulvar fumigator according to claim 1, wherein the anus hot air spray part (140) comprises an anus spray housing (141) disposed close to the hot air and fume spray part (130) in such a way as to be fixed to one surface of the base member (110), an anus heater (142) located at one side of the interior of the anus spray housing (141) in such a way as to emit heat under the control of the controller (120), an anus blower (143) disposed close to the anus heater (142) at the inside of the anus spray housing (141) in such a way as to blow air toward the anus heater (142) under the control of the controller (120), and an anus supply pipe (144) having one end connected to the anus spray housing (141) and the other end connected to the anus spray hole (110*b*) in such a way as to allow the hot air to be supplied to the anus spray hole (110*b*).

6. The individually controllable vulvar fumigator according to claim 1, wherein the covering member (160) comprises first, second, and third covering members (161, 162, and 163) adapted to coveringly protect the controller (120), the hot air and fume spray part (130), and the anus hot air spray part (140) from the outside if one end of the covering member (160) is detachably coupled to one surface of the base member (110), the first covering member (161) having a button exposing hole and lamp exposure holes formed thereon in such away as to expose the operating button (121) and notifying lamps (124) of the controller (120) to the outside, and the third covering member (163) having introduction holes (163*a*) formed thereon in such a way as to introduce outside air.

* * * * *